United States Patent [19]

Mori

[11] Patent Number: 4,617,172

[45] Date of Patent: Oct. 14, 1986

[54] ALUMINUM ALLOYS OF HIGH WEAR RESISTANCE AND GOOD ANTI-SEIZURE PROPERTY SUITABLE FOR USE AS BEARING METALS

[75] Inventor: Sanae Mori, Nagoya, Japan

[73] Assignee: Daido Metal Company Ltd., Nagoya, Japan

[21] Appl. No.: 660,552

[22] Filed: Oct. 15, 1984

Related U.S. Application Data

[63] Continuation of Ser. No. 365,653, Apr. 5, 1982, abandoned.

[30] Foreign Application Priority Data

Jul. 2, 1981 [JP] Japan .................................. 56-103675

[51] Int. Cl.[4] ............................................. C22C 21/14
[52] U.S. Cl. ..................................... 420/530; 420/587
[58] Field of Search ............................. 420/530, 587; 148/416–419, 438, 439, 442

[56] References Cited

U.S. PATENT DOCUMENTS 4,278,740  7/1981  Nara et al. ............................. 75/140
4,340,649  7/1982  Nara et al. ........................... 420/530

Primary Examiner—R. Dean
Attorney, Agent, or Firm—Browdy and Neimark

[57] ABSTRACT

Alloys obtained by adding 0.01–3% by weight of at least one alloying element selected from the group consisting of Mn, V, Cr, Ti, Mg and Ni to slide bearing alloys of the Al-Sn-Pb-Cu system of the prior art. By adding at least one selectively added alloying element, it is possible to markedly improve the wear resistance and anti-seizure property of the bearing alloys to thereby satisfy the requirements of coping with an increase in the speed and load of internal combustion engines.

3 Claims, No Drawings

ALUMINUM ALLOYS OF HIGH WEAR RESISTANCE AND GOOD ANTI-SEIZURE PROPERTY SUITABLE FOR USE AS BEARING METALS

This application is a continuation of application Ser. No. 365,653, filed Apr. 5, 1982, abandoned.

BACKGROUND OF THE INVENTION

This invention relates to improvements in aluminum alloys suitable for use as bearing metals.

Aluminum alloys hitherto known as bearing alloys include, for example, aluminum alloys disclosed in Japanese Patent Publication No. 12131/77 (hereinafter referred to as the prior application invention). They are of four types, i.e., (1) alloys of the Al-Sn-Pb-Sb-Cu system, (2) alloys obtained by adding to the alloys of type (1) one metal selected from the group consisting of Ni, Mn and Si, (3) alloys obtained by adding Ti to the alloys of type (1), and (4) alloys obtained by adding Ti to the alloys of type (2). The alloys provided by the prior application invention have fairly high wear resistance and fairly good compatibility or anti-seizure property which are important characteristics for slide bearings. However, advances made in the progress of internal combustion engines in recent years have created a demand for slide bearings of higher performance.

SUMMARY OF THE INVENTION (1) Object of the Invention

This invention has, as its object, the provision of aluminum alloys suitable for use as bearing metals that have higher wear resistance and better anti-seizure property that the aluminum bearing metals provided by the prior application invention.

(2) Statement of the Invention

The aforesaid object is accomplished according to the invention by providing aluminum alloys obtained by adding to the alloys of the Al-Sn-Pb-Cu-Si system at least one alloying element selected from the group consisting of Mn, V, Cr, Ti, Mg, and Ni. More specifically, the alloys according to the invention are aluminum base bearing alloys of high wear resistance and good anti-seizure property consisting essentially, by weight %, of 3-40% Sn, 0.1-10% Pb, 0.1-3% Sb, 0.2-5% Cu, 0.1-3% Si, 0.01-3% of at least one alloying element selected from the group consisting of Mn, V, Cr, Ti, Mg and Ni, and the balance Al and incidental impurities.

The reasons why the bearing metals of aluminum alloys according to the invention have the aforesaid composition or the reasons why the components of the alloys have the values set forth hereinabove (their upper and lower limits) as well as the effects achieved by the alloys in operation (including synergystic effects achieved in operation) will be described hereinafter item by item.

(1) Sn, 3-40 weight %

This alloying element is concerned in improving the surface properties of the bearing material formed of the alloys of the invention, such as embeddability, anti-seizure property, compatibility, etc., and enabling a shaft of a soft material to be journalled on the bearings formed of the bearing material of the alloys according to the invention. When Sn is below 3%, satisfactory results are unobtainable, while if it is over 40%, mechanical properties of the alloys are markedly reduced.

(2) Pb, 0.1-10 weight %

Pb contributes to improving the bearing material with regard to affinity with oil, non-seizure property and machinability. In the case of this alloy element, when the addition is below 0.1% in amount, no meritorious effect is achieved; when the addition is over 10% in amount, difficulties are encountered in obtaining uniform distribution of the alloying elements as fine particles over the aluminum matrix.

(3) Sb, 0.1-3 weight %

Sb helps Pb in being uniformly distributed as fine particles in the matrix of the alloys of the Al-Sn-Pb system, and has the effect of improving mechanical properties, such as elongation, tensile strength, fatigue strength, etc., of the aluminum matrix in the bearing metals of the aluminum alloy systems. When Sb is below 0.1% in amount, little effect is achieved; while when it is over 3%, the alloys have their mechanical properties reduced, particularly elongation is reduced and hardness is increased, thereby deteriorating the performance of the bearings. This is not desirable.

(4) Cu, 0.2-5 weight %

This element is helpful in improving the mechanical properties of the aluminum matrix, thereby contributing to improve the load bearing capacity and wear resistance of the bearings formed of such bearing metal. However, when the amount is below 0.2%, the wear resistance and load bearing capacity of the bearings are not sufficiently improved; when it exceeds 5%, deectility is markedly reduced and workability for plastic deformation of the alloys is greatly lowered.

(5) Si, 0.1-3 weight %

This element is added for the purpose of improving the creep rupture resistance and anti-seizure property of the aluminum matrix. Addition of this element has almost no effect in attaining the aimed object when the amount is below 0.1%, thereby making it possible to improve the aforesaid properties. Addition of the element in an amount exceeding 3% causes a reduction in ductility and a lowering workability in plastic deformation.

(6) At least one element selected from the group consisting of Mn, V, Cr, Ti, Mg and Ni, 0.01 to 3 weight %

Any of these elements has little effect in improving wear resistance and anti-seizure property of the bearing metals which constitutes the object of the invention when the added amount is below 0.01%, and the alloys themselves become brittle when the amount exceeds 3%. When more than two of these additives are used, the optimum amounts may vary depending on how they cooperate with the elements specified in paragraphs (1)-(5) above in operation and what are the synergystic effects achieved by them. Of the aforesaid selective addition elements, Ti has effect, as exemplified by its use in the alloys provided by the prior application invention, in forming five crystal grains when added to the alloys in a range of 0.01-1%.

It has been found that when one or more than two additives are used, the addition can achieve excellent results if their amount is in the range between 0.01 and 3 weight % in total, preferably 0.02 to 3%.

(7) Incidental impurities

Incidental impurities that are incorporated in the alloys in the process of production include Fe, for example.

DESCRIPTION OF THE PREFERRED EMBODIMENT

The invention will now be described in detail by referring to an embodiment.

EXAMPLE

The alloys (specimens Nos. 1–15) according to the invention and those (specimens Nos. 16–24) of the applicant's prior application invention for comparison purpose, having the chemical compositions shown in Table 1, were formed in strip form. The strips of the alloys produced were bonded on steel strips lining and passed through a rolling mill to provide a bond to the two layers of strips by pressing them. After applying the lining to the bonded strips, they were fed to a bearing forming machine to prepare composite bearings of a semi-cylindrical shape (slide bearings and planar bearings) in which the bearings have an inner diameter of 40 mm and a width of 17.1 mm and the lining has a thickness of 0.3 mm.

Tables 2 and 3 show the results of the tests conducted on those composite bearings which have been used for testings. Table 2 dealing with the results of fatigue tests and Table 3 those of seizure tests.

The test conditions of the fatigue tests and seizure tests, which are shown in Tables 4 and 5, respectively, will be briefly described hereinafter.

In the fatigue tests, a dynamic load fatigue tester with a number of revolutions of 4000 rpm was used and the specimens were loaded in such a manner that starting with an initial load of 300 kg/cm$^2$, the load applied was increased stepwise by 50 kg/cm$^2$ after lapse of twenty (20) hours until each specimens showed a sign of fatigue. When no sign of fatigue was observed, each test was terminated with a load of 450 kg/cm$^2$ being applied as a final load. The details of the test conditions and the evaluation of the test results are shown in Table 4.

The seizure tests were conducted by using a static load seizing tester with a number of revolutions of 3000 rpm, starting with an initial load of 300 kg/cm$^2$, and the load was increased stepwise by 50 kg/cm$^2$ for every ten (10 minutes that elapsed and the tests were continued until seizure occurred. When no sign of seizure was observed, each test was terminated with a load of 600 kg/cm$^2$ being applied as a final load.

The results of the fatigue tests shown in Table 2 show that the specimen No. 4 of the alloy according to the invention (see Table 1) obtained by adding alloying elements including, by weight %, 2.5% Si, 0.3% Mn, 1.0% Ni, 0.5% V, 0.3% Mg and 0.05% Ti to the specimen No. 16 of the patented prior application (see Table 1) has markedly improved fatigue strength by virtue of the synergystic effects provided by the alloying elements referred to hereinabove, no signs of fatigue having been observed when a bearing load of 450 kg/cm$^2$ was applied. The specimen No. 16 of the prior application alloy showed a sign of fatigue when a bearing load of 400 kg/cm$^2$ was applied. Analysis of the results of the seizure tests shown in Table 3 shows that whereas the specimen No. 16 of the prior application alloy developed seizure when a bearing load of 300 kg/cm$^2$ was applied, it was only after a load of 400 kg/cm$^2$, higher by 100 kg/cm$^2$ than the load of 300 kg/cm$^2$ applied to Specimen 16, that the specimen No. 4 of the alloy according to the invention developed seizure.

A study of the results of the fatigue tests shown in Table 2 shows that the specimen No. 5 of the alloy according to the invention (see Table 1) obtained by adding alloying elements including, by weight %, 2.5% Si, 0.3% Mn, 1.0% Ni and 0.3% each of V, Mg and Cr to the specimen No. 16 of the prior application invention (see Table 1) has markedly improved fatigue strength by virtue of the synergystic effects provided by the alloying elements referred to hereinabove. No signs of fatigue were observed when a bearing load of 450 kg/cm$^2$ was applied. The specimen No. 16 of the prior application invention alloy showed signs of fatigue when a bearing load of 400 kg/cm$^2$ was applied.

Analysis of the results of the seizure tests shown in Table 3 shows that whereas seizure occurred with an application of a bearing load of 300 kg/cm$^2$ in the specimen No. 16 of the prior application invention alloy, seizure occurred in the specimen No. 5 of the alloy according to the invention only after a bearing load of 450 kg/cm$^2$, higher by 150 kg/cm$^2$ than the load of 300 kg/cm$^2$, was applied.

The results of the fatigue tests shown in Table 2 show that the specimen No. 8 of the alloy according to the invention obtained by adding alloying elements including, by weight %, 0.5% each of Ni. V and Mg and 0.05% Ti to the specimen No. 22 of the prior application invention alloy developed fatigue only after a bearing load of 400 kg/cm$^2$ was applied by virtue of the synergystic effects of the alloying elements. It is also shown that the specimen No. 22 of the prior application invention alloy showed signs of fatigue when a bearing load of 350 kg/cm$^2$ was applied.

A study of the results of the seizure tests shown in Table 3 shows that whereas the specimen No. 22 of the prior application invention alloy developed seizure when a bearing load of 450 kg/cm$^2$ was applied, it was only after a bearing load of 550 kg/cm$^2$, higher by 100 kg/cm$^2$ than the load of 450 kg/cm$^2$, was applied that the specimen No. 8 of the alloy according to the invention developed seizure.

The specimen No. 11 of the alloy according to the invention obtained by adding alloying elements including, by weight %, 2.5% Si and 0.5% Mn to the specimen No. 23 of the prior application invention alloy developed fatigue only after a bearing load of 350 kg/cm$^2$ was applied by virtue of the synergystic effects of the alloying elements. Signs of fatigue were observed in the specimen No. 23 of the prior application invention alloy when a bearing load of 300 kg/cm$^2$ was applied.

According to the results of the seizure tests shown in Table 3, seizure occurred in the specimen No. 23 of the prior application invention alloy when only a bearing load of 550 kg/cm$^2$ was applied. However, it was only after a bearing load of 600 kg/cm$^2$, higher by 50 kg/cm$^2$, than the bearing load of 550 kg/cm$^2$, was applied that seizure occurred in the specimen No. 11 of the alloy according to the invention.

The specimen No. 15 of the alloy according to the invention obtained by adding to the specimen No. 24 of the prior application invention alloy, by weight %, 4.0% Pb to increase the amount of Pb in the alloy to a total of 9.0% and alloying elements including, by weight %, 2.5% Si, 0.3% Mn, 1.0% Ni and 0.3% each of V, Mg and Cr showed signs of fatigue when a bearing load of 300 kg/cm$^2$ was applied and had the same value of fatigue strength as the specimen No. 24 of the prior application patent alloy. However, according to the results of the seizure tests shown in Table 3, seizure occurred in the specimen No. 24 of the prior application invention alloy when a bearing load of 550 kg/cm² was applied but the specimen No. 15 of the alloy according to the invention showed no signs of seizure even when a bearing load of 600 kg/cm², higher by 50 kg/cm², than the bearing load of 550 kg/cm², was applied, merely showing deformation (creep) of the alloy and thereby indicating that an improvement was provided to the anti-seizure property.

What is more noteworthy in the results of the tests shown in Tables 1–3 is that the specimen No. 1 of the alloy according to the invention obtained by adding, by weight %, 3.0% Cu to the specimen No. 16 of the prior application invention alloy to increase the amount of Cu to a total of 4.0%, reducing, by weight %, 0.9% Pb from 1.0% to make 0.1%, adding 0.5% Si, and further adding 0.5% Mn which is one of the selective alloying elements according to the invention has improved fatigue strength. It showed no signs of fatigue even when a bearing load of 450 kg/cm² was applied. Meanwhile the specimen No. 16 of the prior application invention alloy showed no signs of fatigue when a bearing load of 400 kg/cm² was applied.

The results of the seizure tests also show that whereas seizure occurred in the specimen No. 16 of the prior application invention alloy when a bearing load of 300 kg/cm² was applied, it was only when a bearing load of 350 kg/cm² was applied that the specimen No. 1 of the alloy according to the invention developed seizure.

From the foregoing description, it will be appreciated that the alloys according to the invention have markedly improved wear resistance and anti-seizure property as compared with the alloys of the prior application invention. Thus it will be apparent that the aforesaid object of the invention can be accomplished by using the alloys according to the invention.

TABLE 2

Results of Fatigue Tests Bearing Load (kg/cm²)

| Specimen No. | 300 | 350 | 400 | 450 | Result |
|---|---|---|---|---|---|
| *Alloys of the present Invention* | | | | | |
| 1 | | | | → | No Fatigue |
| 2 | | | | → | No Fatigue |
| 3 | | | | → | No Fatigue |
| 4 | | | | → | No Fatigue |
| 5 | | | | → | No Fatigue |
| 6 | | | → | | Fatigue occurred |
| 7 | | | → | | Fatigue occurred |
| 8 | | | → | | Fatigue occurred |
| 9 | | | → | | Fatigue occurred |
| 10 | | | → | | Fatigue occurred |
| 11 | | → | | | Fatigue occurred |
| 12 | | → | | | Fatigue occurred |
| 13 | | → | | | Fatigue occurred |
| 14 | | → | | | Fatigue occurred |
| 15 | → | | | | Fatigue occurred |
| *Alloys of the prior Patent Application* | | | | | |
| 16 | | | → | | Fatigue occurred |
| 17 | | → | | | Fatigue occurred |
| 18 | | | → | | Fatigue occurred |
| 19 | | | → | | Fatigue occurred |

TABLE 1

Alloys Chemical Composition (Weight %)

| Specimen No. | Sn | Pb | Sb | Cu | Si | Mn | Ni | V | Mg | Cr | Ti | Al and Impurities |
|---|---|---|---|---|---|---|---|---|---|---|---|---|
| *Alloys of the present Invention* | | | | | | | | | | | | |
| 1 | 6 | 0.1 | 0.5 | 4.0 | 0.5 | 0.5 | — | — | — | — | — | Balance |
| 2 | 6 | 0.1 | 0.5 | 3.0 | 2.5 | — | — | 0.5 | — | 0.2 | — | Balance |
| 3 | 6 | 0.5 | 0.5 | 4.0 | 1.5 | — | 0.5 | 0.5 | 0.5 | — | — | Balance |
| 4 | 6 | 1.0 | 0.5 | 1.0 | 2.5 | 0.3 | 1.0 | 0.5 | 0.3 | — | 0.05 | Balance |
| 5 | 6 | 1.0 | 0.5 | 1.0 | 2.5 | 0.3 | 1.0 | 0.3 | 0.3 | 0.3 | — | Balance |
| 6 | 17 | 2.0 | 2.0 | 3.0 | 2.5 | 0.5 | — | — | — | — | — | Balance |
| 7 | 17 | 3.0 | 2.0 | 3.0 | 2.5 | — | — | 0.5 | — | — | — | Balance |
| 8 | 17 | 3.0 | 2.0 | 1.0 | 2.5 | — | 0.5 | 0.5 | 0.5 | — | 0.05 | Balance |
| 9 | 17 | 4.0 | 2.0 | 1.0 | 2.5 | 0.3 | 1.0 | 0.5 | 0.3 | — | — | Balance |
| 10 | 17 | 5.0 | 2.0 | 1.0 | 2.5 | 0.3 | 1.0 | 0.3 | 0.3 | 0.3 | — | Balance |
| 11 | 30 | 4.0 | 2.5 | 1.0 | 2.5 | 0.5 | — | — | — | — | — | Balance |
| 12 | 35 | 6.0 | 2.5 | 1.0 | 2.5 | — | — | 0.5 | — | 0.2 | 0.5 | Balance |
| 13 | 35 | 7.0 | 2.5 | 1.0 | 0.5 | — | 0.5 | 0.5 | 0.5 | — | — | Balance |
| 14 | 35 | 8.0 | 3.0 | 1.0 | 2.5 | 0.3 | 1.0 | 0.5 | 0.3 | — | — | Balance |
| 15 | 40 | 9.0 | 3.0 | 1.0 | 2.5 | 0.3 | 1.0 | 0.3 | 0.3 | 0.3 | — | Balance |
| *Alloys of the prior Patent Application* | | | | | | | | | | | | |
| 16 | 6 | 1.0 | 0.5 | 1.0 | — | — | — | — | — | — | — | Balance |
| 17 | 17 | 3.0 | 2.0 | 1.0 | — | — | — | — | — | — | — | Balance |
| 18 | 17 | 3.0 | 2.0 | 1.0 | — | — | 1.0 | — | — | — | — | Balance |
| 19 | 17 | 3.0 | 2.0 | 1.0 | — | 0.3 | — | — | — | — | — | Balance |
| 20 | 17 | 3.0 | 2.0 | 1.0 | 2.5 | — | — | — | — | — | — | Balance |
| 21 | 17 | 3.0 | 2.0 | 1.0 | — | — | — | — | — | — | 0.05 | Balance |
| 22 | 17 | 3.0 | 2.0 | 1.0 | 2.5 | — | — | — | — | — | 0.05 | Balance |
| 23 | 30 | 4.0 | 2.5 | 1.0 | — | — | — | — | — | — | — | Balance |
| 24 | 40 | 5.0 | 3.0 | 1.0 | — | — | — | — | — | — | — | Balance |

TABLE 2-continued

Alloys
Results of Fatigue Tests

| Specimen No. | Bearing Load (kg/cm$^2$) | | | |
|---|---|---|---|---|
| | 300 | 350 | 400 | 450 |
| 20 | →→→ Fatigue occurred | | | |
| 21 | →→→ Fatigue occurred | | | |
| 22 | →→→ Fatigue occurred | | | |
| 23 | →→ Fatigue occurred | | | |
| 24 | →→ Fatigue occurred | | | |

TABLE 3

Alloys
Results of Seizure Tests

| Specimen No. | Bearing Load (kg/cm$^2$) | | | | | | |
|---|---|---|---|---|---|---|---|
| | 300 | 350 | 400 | 450 | 500 | 550 | 600 |

Alloys of the Invention

| | | | | | | | |
|---|---|---|---|---|---|---|---|
| 1 | →→ Seizure | | | | | | |
| 2 | →→→ Seizure | | | | | | |
| 3 | →→ Seizure | | | | | | |
| 4 | →→→ Seizure | | | | | | |
| 5 | →→→→ Seizure | | | | | | |
| 6 | →→→→→ Seizure | | | | | | |
| 7 | →→→→→→ Seizure | | | | | | |
| 8 | →→→→→→ Seizure | | | | | | |
| 9 | →→→→→→ Seizure | | | | | | |
| 10 | →→→→→→ Seizure | | | | | | |
| 11 | →→→→→→→ Seizure | | | | | | |
| 12 | →→→→→→→ Seizure | | | | | | |
| 13 | →→→→→→ Seizure | | | | | | |
| 14 | →→→→→→→ No Seizure | | | | | | |
| 15 | →→→→→→→ Deformation of Alloy | | | | | | |

Alloys of Prior Appln. Patent

| | | | | | | | |
|---|---|---|---|---|---|---|---|
| 16 | → Seizure | | | | | | |
| 17 | →→ Seizure | | | | | | |
| 18 | →→ Seizure | | | | | | |
| 19 | →→→ Seizure | | | | | | |
| 20 | →→→ Seizure | | | | | | |
| 21 | →→ Seizure | | | | | | |
| 22 | →→→ Seizure | | | | | | |
| 23 | →→→→→ Seizure | | | | | | |
| 24 | →→→→→ Seizure | | | | | | |

TABLE 4

Test Conditions
(Fatigue Tests)

| Tester | Dynamic Load Fatigue Tester |
|---|---|
| No. of Revolutions | 4000 rpm |
| Test Time | 20 Hr |
| Peripheral speed | 8.4 m/sec |
| Feed Oil Temperature | 120° C. |
| Feed Oil Pressure | 3.0 kg/cm$^2$ |
| Lubricant | #20 straight motor oil |
| Feed Oil Angle | Advance Angle 36 degrees |
| Evaluation of Test Results | Specimens were decided as developed fatigue when over 5% of the bearing area showings of fatigue. |

TABLE 5

Test Conditions
(Seizure Tests)

| Tester | Static Load Seizure Tester |
|---|---|
| No. of Revolutions | 2000 rpm |
| Test Time | Each load applied for 10 minutes, |

TABLE 5-continued

|  | Test Conditions (Seizure Tests) |
| --- | --- |
|  | the load increased by 50 kg/cm² step by step. |
| Peripheral Speed | 4.2 m/sec |
| Feed Oil Temperature | 100° C. |
| Flow Rate of Feed Oil | 20 cc/min |
| Lubricant | #20 straight motor oil |
| Oil Clearance | 0.04–0.06 mm |
| Evaluation of Test Results | Specimens were decided as developed seizure when the temperature of the bearing on the back surface exceeded 200° C. or when the motor developed overloading. |

What is claimed is:

1. Aluminum base bearing alloy for use as bearing metals, consisting by weight of 3–40% Sn, 0.1–10% Pb, 0.1–3% Sb, 0.2–5% Cu, 0.1–3% Si, 0.01–3% V, 0–0.29% of at least one addition metal selected from the group consisting of Mn, Ti, Mg and Ni wherein the total amount of said additional metal and vanadium is from 0.01–3% and the balance Al and incidental impurities.

2. Aluminum base bearing alloy for use as bearing metals, consisting by weight of 3–40% Sn, 0.1–10% Pb, 0.1–3% Sb, 0.2–5% Cu, 0.1–3% Si, 0.01–3% V, and the balance being Al and incidental impurities, with the proviso that Cr is not present.

3. Aluminum base bearing alloy for use as bearing metal, consisting by weight of 3–40% Sn, 0.1–10% Pb, 0.1–3% Sb, 0.2–5% Cu, 0.1–3% Si, 0.01–3% V,
   0–0.29% of at least one additional metal selected from the group consisting of Mn, Ti, Mg and Ni wherein the total amount of said additional metal and vanadium is from 0.02–3%, and
   the balance Al and incidental impurities.

* * * * *